Jan. 29, 1929.　　　　　　　　　　　　　　　　1,700,258
H. FOLKER
WEIGHING SCALE
Filed Dec. 24, 1925　　　　3 Sheets-Sheet 3

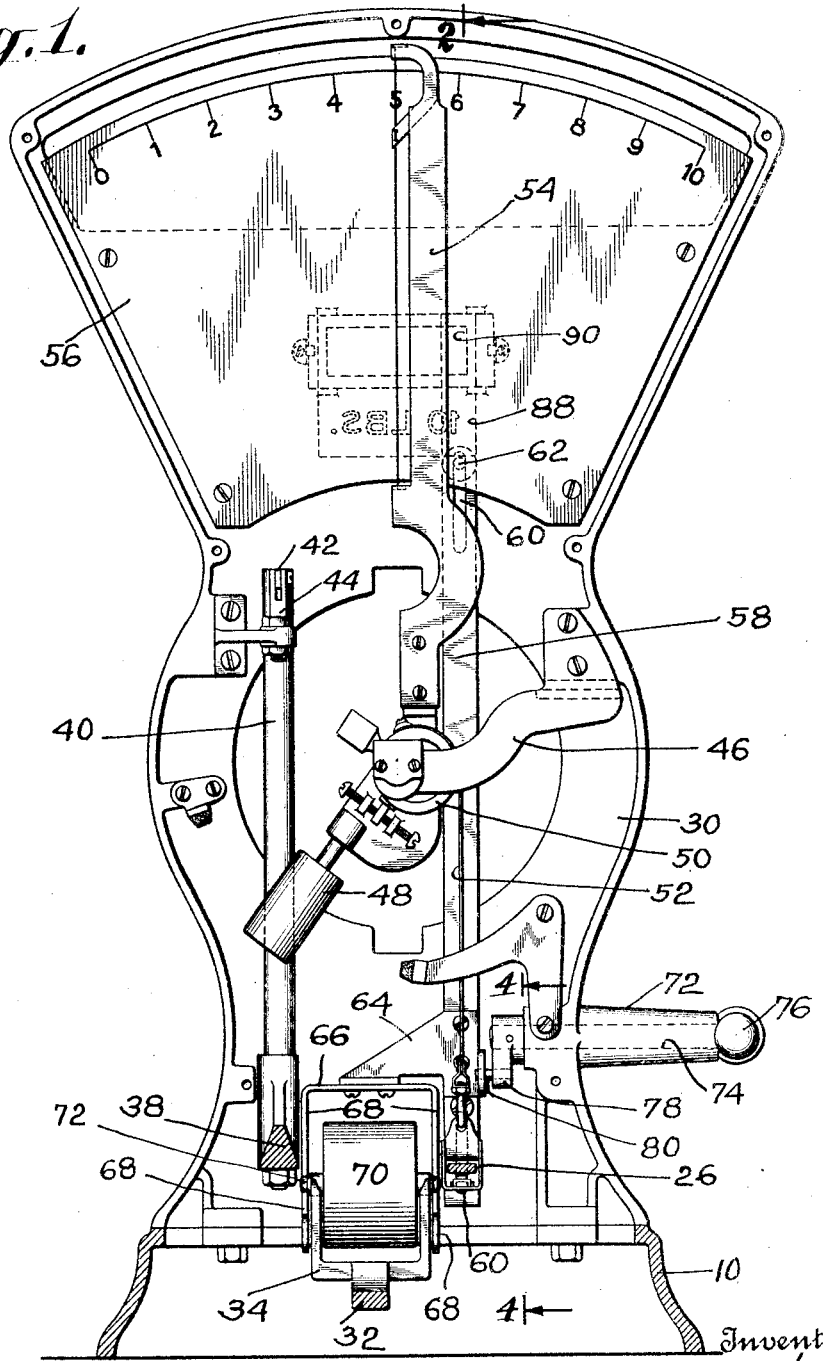

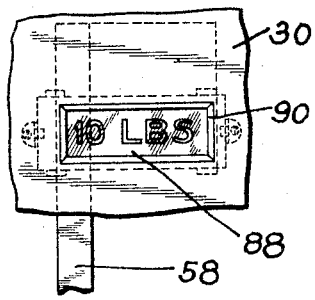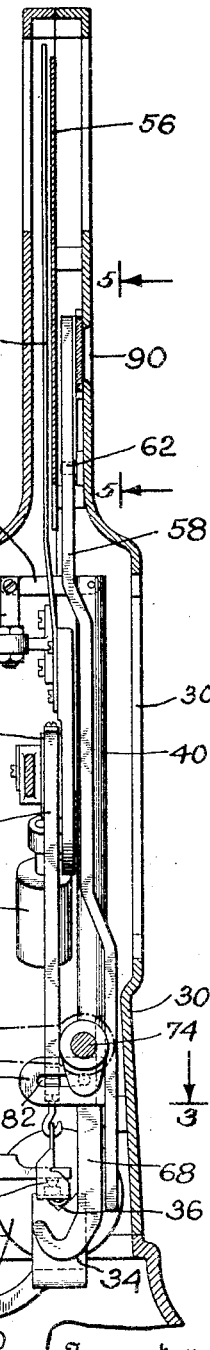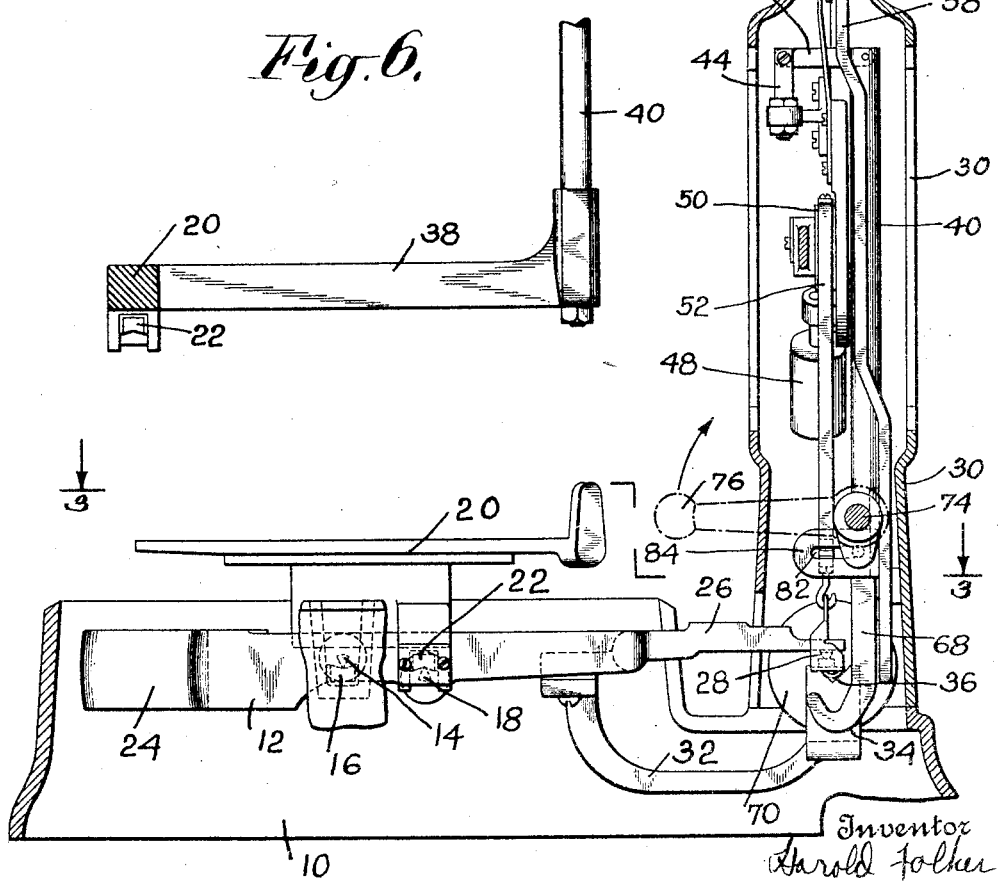

Inventor
Harold Folker
By his Attorneys
Cooper, Kent & Dunham

Patented Jan. 29, 1929.

1,700,258

UNITED STATES PATENT OFFICE.

HAROLD FOLKER, OF DAYTON, OHIO, ASSIGNOR TO DAYTON SCALE COMPANY, OF DAYTON, OHIO, A CORPORATION OF NEW JERSEY.

WEIGHING SCALE.

Application filed December 24, 1925. Serial No. 77,429.

This invention pertains to automatic weighing scales of the type in which a variable load offsetting means, such as a spring or pendulum, is used to counterbalance the load on the scale platform or pan, the weight of the goods being indicated on a graduated chart.

In using such a scale it sometimes happens that the operator wishes to weigh a load greater than the capacity of the automatic counterbalancing device. To meet such requirements scales of this kind may be provided with manually settable weights which may be applied to or removed from the operative mechanism of the scale in order to increase the weighing capacity of the machine beyond its normal chart capacity.

My present invention is disclosed in connection with the particular type of automatic scale that employs a pendulum in cooperation with a lever of the first order with the pendulum attached to the end of the lever opposite the platform. Therefore the pendulum falls as the load increases, and the pendulum end of the lever must be weighted to oppose the load. With such an arrangement the capacity of the scale is increased when the capacity weight is removed, as will appear in the description which covers an automatic scale designed for use on a counter. In such use the operator is on the platform side of the machine and the customer on the opposite side. Under such circumstances it is important that the customer be advised whether the capacity weight is in effective or non-effective position, so I provide an opening or window on the customers' side in which is displayed a signal so interconnected with the weight actuating mechanism as to inform the customer whether the capacity weight is in operative or non-operative position.

Another important feature in scales of this kind is that the capacity weight mechanism be not easily reached by unauthorized persons who might tamper with it and thereby affect the accuracy of the scale.

The particular object of my present invention is to provide improved mechanism for the above purposes, which may be easily operated, fully enclosed except the operating handle, not easily tampered with, substantial, durable, and not expensive to manufacture.

In the drawings,

Fig. 1 is a view of the mechanism contained within the upright housing, from the operator's side, with front half of the housing removed.

Fig. 2 is a side view of the mechanism showing the base, partly broken away, and the base lever system together with a sectional view of the parts within the vertical housing on line 2—2 of Fig. 1.

Fig. 5 is a detail of the customer's signal window on line 5—5 of Fig. 2.

Fig. 6 is a detail of the platform and check stem on line 6—6 of Fig. 3.

Figure 3:
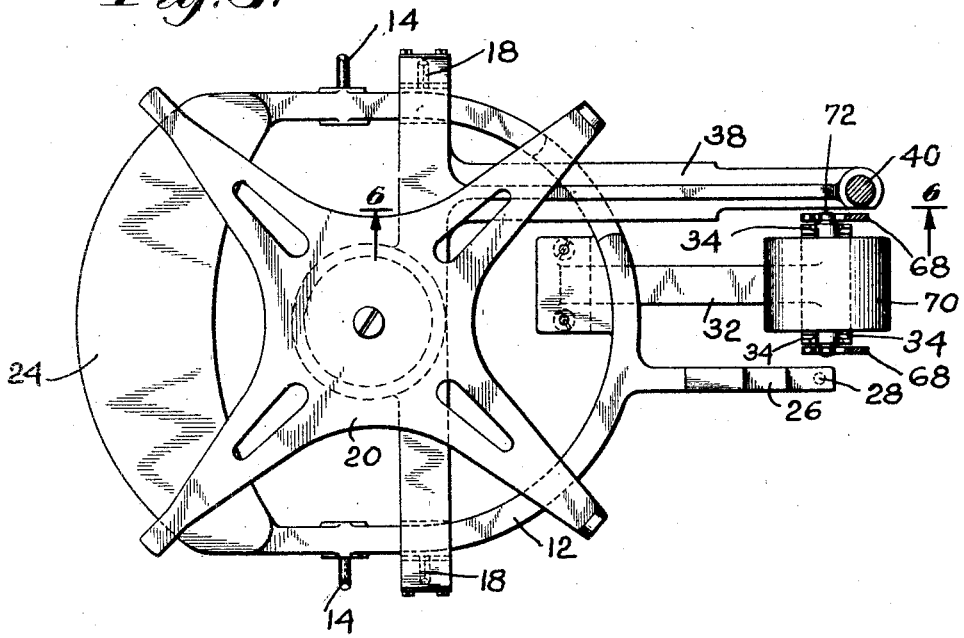
Fig. 3 is a plan view on line 3—3 of Fig. 2.

The scale comprises a base 10 in which is mounted a horizontal yoke shaped lever 12 provided with fulcrum pivots 14 resting on bearings 16 mounted in sockets on the sides of base 10. Lever 12 has load pivots 18, one on each side, and these pivots carry the platform frame 20 provided with bearings 22 which rest on pivots 18. On the front end of lever 12 is a counterweight 24. Projecting rearwardly into the upright housing 30 is an extension 26 of lever 12 provided with a cone pivot 28. Also projecting rearwardly from lever 12 to a point within housing 30, is a curved arm 32, provided within the housing with a yoke 34 having V notches 36 in its upper edges for the purpose of supporting the capacity weight as will appear.

Projecting rearwardly from platform frame 20 is an arm 38 from which rises, within housing 30, the stem 40 engaging at its upper end one end of the check stay 42, the other end of which engages check stem 44 fast to housing 30 to form the check system on parallel motion to keep the scale platform horizontal during its operation.

Carried by bracket 46 fast to housing 30 is the pendulum 48 which by means of rectifying cam 50 and tape 52 is connected at pivot 28 with base lever 12. Rigidly connected to pendulum 48 is the upwardly extending indicator 54 which sweeps across chart 56 until it comes to rest at a point indicating the weight of the load. Chart 56 may, if desired, be graduated with computed values in addition to weights, in which case the value of the goods as well as their weight may be read from chart 56 by means of indicator 54.

Within housing 30 is a vertical member 58 provided with slots 60 which engage studs 62 fast in housing 30 so that member 58 may be moved vertically relatively to housing 30. Secured rigidly to the lower end of member 58 is a bracket 64 (Fig. 1) to which is fast yoke 66 having two downwardly extending hooks 68.

Figure 4:
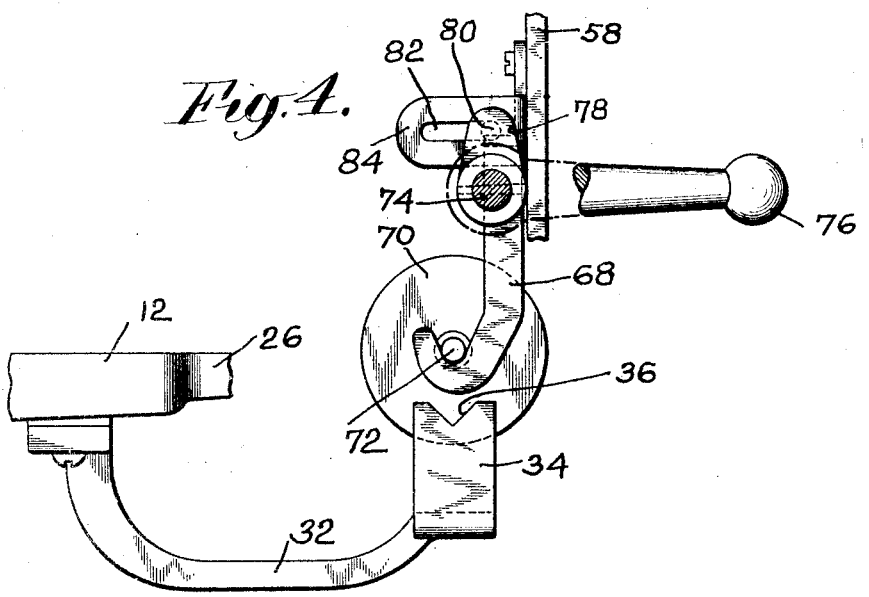
Fig. 4 is an enlarged detail of the capacity weight device, on line 4—4 of Fig. 1.

70 is the capacity weight in the form of a horizontal cylinder with a trunnion 72 on each end. When the weight is lowered onto the scale lever trunnions 72 rest in V notches 36, and hooks 68 hang free (Fig. 2). When weight 70 is raised from notches 36 it is supported by hooks 68 (Fig. 4). When weight 70 is resting in notches 36 the axis of the weight is in the plane of pivots 14 and 18.

To raise and lower weight 70 the following mechanism is provided. Rotatably mounted in a boss 72 projecting from the side of housing 30 is a shaft 74 provided on its outer end with an operating handle 76 by means of which shaft 74 may be rotated through an angle of 180 degrees. The inner end of shaft 74 has fast to it a crank 78 provided with a crank pin 80 fitted into the horizontal slot 82 in bracket 84 which is integral with bracket 64 (Fig. 4). When handle 76 is in normal position as in Fig. 2, crank pin 80 forces downwardly member 58, bracket 64, and hooks 68, thus allowing weight 70 to rest on yoke 34 with its trunnion 72 in notches 36. While in this position hooks 68 are entirely free from contact with weight 70. When handle 76 is moved in the direction of the arrow in Fig. 2 crank pin 80 forces member 58 and hooks 68 to the position shown in Fig 4, in which the capacity weight 70 is carried by hooks 68 entirely free from yoke 34.

It will be noted that weight 70 is on the same side of fulcrum bearings as the platform. To adjust 70 to its proper weight a load equal to the capacity of the scale chart is placed on the platform and the weight of counterweight 24 is adjusted to bring the indicator to zero on the chart. The load is then removed from the platform, weight 70 is placed in notches 36 and adjusted in weight to again bring the indicator to zero. The scale is then in position to weigh loads from zero to the capacity of the chart.

The removal of weight 70 from yoke 34 has the same effect as the removal of a capacity load from the scale platform. Therefore when weight 70 is removed from yoke 34 by the operation of handle 76 the scale is in condition to weigh a load of chart capacity in addition to the capacity load already on the platform. In other words, when weight 70 is carried by the scale lever in notches 36, the scale will automatically indicate any load from zero to chart capacity, and when weight 70 is off the lever the scale will indicate the weight of any load between the chart capacity and double the chart capacity. Weight 70 serves to double the capacity of the scale and is therefore commonly referred to as a "doubling weight".

Fast on the upper end of member 58 is a signal plate 88 bearing on its lower half an inscription representing the chart capacity of the scale. When doubling weight 70 is in normal position as in Fig. 2 only the blank upper half of plate 88 is visible to the customer through window 90, but when doubling weight 70 is raised to the position of Fig. 4, thereby doubling the capacity of the scale member 58 is raised and with it signal plate 88 until its lower half is opposite window 90 and the customer is apprised by viewing the inscription thereon that doubling weight is in effective position.

I claim—

1. An automatic weighing scale comprising in combination a lever, a fixed counterweight on one end of said lever, a weight support on the other end of said lever, a goods platform on the same end of the lever as the weight support, a capacity weight, settable means to apply said weight to or remove it from said weight support, and a signal device interconnected with said settable means for the purpose described.

2. An automatic weighing scale comprising in combination a lever, a fulcrum supporting said lever, a platform carried by said lever, a pendulum operatively connected to said lever on the same end of the lever as said platform, a weight support on said lever adjacent said pendulum connection, a capacity weight normally resting on said weight support means to increase the weighing capacity of said scale by removing said weight from said weight support and an automatic device to signal whether said capacity weight is on or off said weight support.

3. The invention set forth in claim 1 in which a weight indicating chart is provided and in which said signal device automatically indicates the amount by which the weight of the goods exceeds the weight indicated on said chart.

4. The invention set forth in claim 2 in which a weight indicating chart is provided and in which said signal device automatically indicates the amount by which the weight of the goods exceeds the weight indicated on said chart.

5. In an automatic scale, in combination, a fulcrum stand, a lever pivotally supported on said fulcrum stand, a capacity weight, manually operable means for moving said weight into or out of engagement with said lever to change the weighing capacity of the scale, a signal to indicate whether said weight is in or out of engagement with said lever, and means for supporting said weight when out of engagement, said signal and weight supporting means being a unitary structure operable by said weight moving means.

6. The invention set forth in claim 5 in which means is provided to automatically lock said weight against downward movement when it is moved to its out-of-engagement position.

In testimony whereof I hereto affix my signature.

HAROLD FOLKER.